US007906759B2

(12) United States Patent
Manri et al.

(10) Patent No.: US 7,906,759 B2
(45) Date of Patent: Mar. 15, 2011

(54) MASS SPECTROSCOPY SYSTEM AND MASS SPECTROSCOPY METHOD

(75) Inventors: Naomi Manri, Kawagoe (JP); Takashi Baba, Kawagoe (JP); Hiroyuki Satake, Kokubunji (JP)

(73) Assignee: Hitachi High-Technologies Corporation, Tokyo (JP)

( * ) Notice: Subject to any disclaimer, the term of this patent is extended or adjusted under 35 U.S.C. 154(b) by 293 days.

(21) Appl. No.: 12/190,988

(22) Filed: Aug. 13, 2008

(65) Prior Publication Data

US 2009/0072132 A1 Mar. 19, 2009

(30) Foreign Application Priority Data

Sep. 13, 2007 (JP) ................................. 2007-237389

(51) Int. Cl.
*H01J 49/06* (2006.01)
*H01J 49/40* (2006.01)
*G01N 27/62* (2006.01)

(52) U.S. Cl. ........ 250/282; 250/281; 250/284; 250/286; 250/287; 250/288

(58) Field of Classification Search ........................ None
See application file for complete search history.

(56) References Cited

U.S. PATENT DOCUMENTS

| | | | | |
|---|---|---|---|---|
| 4,810,882 | A * | 3/1989 | Bateman | 250/281 |
| 5,202,561 | A * | 4/1993 | Giessmann et al. | 250/281 |
| 6,469,297 | B1 * | 10/2002 | Kato | 250/288 |
| 6,596,989 | B2 * | 7/2003 | Kato | 250/288 |
| 6,852,971 | B2 | 2/2005 | Baba et al. | |
| 6,900,430 | B2 * | 5/2005 | Okumura et al. | 250/281 |
| 7,034,286 | B2 * | 4/2006 | Guevremont et al. | 250/282 |
| 7,034,294 | B2 * | 4/2006 | Schwartz et al. | 250/292 |
| 7,129,478 | B2 | 10/2006 | Baba et al. | |
| 7,164,124 | B2 * | 1/2007 | Takada et al. | 250/288 |
| 7,166,835 | B2 | 1/2007 | Baba et al. | |
| 7,227,133 | B2 | 6/2007 | Glish et al. | |
| 7,253,405 | B2 * | 8/2007 | Kato | 250/288 |
| 7,309,860 | B2 * | 12/2007 | Baba et al. | 250/288 |
| 7,473,892 | B2 * | 1/2009 | Sano et al. | 250/281 |
| 7,531,793 | B2 * | 5/2009 | Satoh et al. | 250/281 |
| 7,547,878 | B2 * | 6/2009 | Schultz et al. | 250/282 |

(Continued)

FOREIGN PATENT DOCUMENTS

JP 2005-302622 10/2005

OTHER PUBLICATIONS

K. Deguchi, et al, Rapid Commun. Mass Spectrom. 2007; 21:691-698.

(Continued)

*Primary Examiner* — David A Vanore
(74) *Attorney, Agent, or Firm* — Mattingly & Malur, P.C.

(57) ABSTRACT

An inexpensive mass spectrometer system is provided. This mass spectrometer is capable obtaining structural information of a substance at an improved efficiency, and the time required for the analysis and identification of the substance has been reduced. Identification precision has also been improved. More specifically, this invention provides a tandem mass spectrometer system in which the sample is ionized at the desired polarity, fragment ions obtained by dissociating the ion is analyzed in first or second mass spectrometer section, polarity of the second mass spectrometer is determined based on the result of the analysis, and the mass spectroscopy is carried out. A method for the mass spectroscopy is also provided.

20 Claims, 9 Drawing Sheets

U.S. PATENT DOCUMENTS

| | | | | |
|---|---|---|---|---|
| 7,626,162 | B2 * | 12/2009 | Hashiba et al. | 250/288 |
| 7,642,509 | B2 * | 1/2010 | Hartmer et al. | 250/282 |
| 7,649,170 | B2 * | 1/2010 | Wang et al. | 250/281 |
| 7,728,288 | B2 * | 6/2010 | Makarov et al. | 250/282 |
| 2008/0048110 | A1 | 2/2008 | Deguchi et al. | |
| 2008/0073508 | A1 | 3/2008 | Hashimoto et al. | |
| 2009/0173878 | A1 * | 7/2009 | Coon et al. | 250/282 |
| 2009/0189063 | A1 * | 7/2009 | Sano et al. | 250/281 |
| 2009/0236516 | A1 * | 9/2009 | Kishi et al. | 250/287 |

OTHER PUBLICATIONS

Anal. Chem., H. Satake, et al. 2007, 79, 8755-8761.

Experimental Medicine, vol. 23, No. 19, 2005, pp. 2951-2956. (with English language Abstract).

Anal. Chem., T. Baba, et al., 2004, 76, 4263-4266.

Experimental Protocols in Proteomics, Shujun-sha, Dec. 18, 2003, pp. 156-168 (with English language Abstract).

* cited by examiner

MASS SPECTROSCOPY SYSTEM AND MASS SPECTROSCOPY METHOD

CLAIM OF PRIORITY

The present application claims priority from Japanese patent application JP 2007-237389 filed on Sep. 13, 2007, the content of which is hereby incorporated by reference into this application.

FIELD OF THE INVENTION

This invention relates to a method for analyzing structure of biological polymers by mass spectroscopy. This invention also relates to a system used for such analysis.

BACKGROUND OF THE INVENTION

The number of protein types present in human body is approximately 100,000. Function of the protein is finely regulated by various post-translational modifications including cleavage by various protease, regulation of the activity or interaction by addition of a carbohydrate moiety, phosphate group, and the like, and localization to membrane by acylation such as myristylation and palmitilation. In particular, in the case of eukaryote, it is rather rare that the proteins synthesized based on the gene arrangement function without further regulation, and they are usually modified in various ways after the synthesis on the ribosome at the site of its synthesis or in various stages before the final localization in the cell is determined. The biopolymer undergoing such spatiotemporal changes can not be identified solely by the genomic information, and the identification will be enabled only after conducing direct analysis of the protein.

One technique used for such structural analysis is mass spectroscopy. Use of such mass spectroscopy has enabled to obtain information on the sequence and the post-translational modification of polypeptides (peptides or proteins comprising amino acid molecules connected by peptide linkage) constituting the biopolymer. In particular, ion trap mass spectroscopy using a radio frequency electric field, mass spectroscopy using a quadrupole mass filter, and time-of-flight (TOF) mass spectroscopy exhibiting high throughput are highly compatible with the pretreatment means such as liquid chromatography system used for the sample separation. Accordingly, these methods are highly appropriate in proteome analysis in which a large variety of samples are continuously analyzed, and these methods are widely used in such application.

In mass spectrometry, sample molecules are generally ionized and introduced in a vacuum (or ionized in a vacuum), and motion of the resulting ion in an electromagnetic field is measured to thereby determine mass-to-charge ratio (m/z) of the target molecule ion. Since the obtainable information is the mass-to-charge ratio which is a macroscopic quantity, information on the internal structure can not be obtained by only one mass spectroscopy operation, and therefore, a method called "tandem mass spectrometry" is used. In the tandem mass spectrometry, the sample molecule ions are isolated and isolated in the first mass spectroscopy operation, and these ions are referred to as precursor ions. The precursor ions are then dissociated by some means, and the dissociated ions are referred to as fragment ions. The fragment ions are then subjected to mass spectroscopy to thereby obtain information on the patterns of the fragment ions. Since each dissociation method has its own dissociation pattern, the sequence structure of the precursor ion can be estimated by using such dissociation pattern. In particular, in the field of analyzing biological molecules having amino acid backbone, dissociation is carried out by such means as collision induced dissociation (CID), infra red multi photon dissociation (IRMPD), electron capture dissociation (ECD), or electron transfer dissociation (ETD).

The technique currently most widely used in the field of protein analysis is CID. In the CID, the precursor ions are kinetically energized and collided with a gas, and the molecular vibrations of the precursor ions are excited by this collision so that dissociation occurs at the weak sites of the molecular chain. A method which has recently come into use is IRMPD. In the IRMPD, the precursor ion is irradiated with infrared laser beam, and the precursor ions are allowed to absorb a large number of photons. This excites molecular vibrations, and the dissociation occurs at the weak sites of the molecular chain. The sites of dissociation are shown in FIG. 11, where a, b, and c respectively designate molecules including the moiety on their $NH_2$ terminal side, and x, y, z respectively designate molecules including the moiety on their COOH terminal side. The weak sites from which dissociation may occur in the CID or IRMPD are the sites "a-x" and "b-y" in the backbone of the molecule comprising the amino acid sequence. However, depending on the pattern of the amino acid sequence, some of the "a-x" and "b-y" sites are less likely to become cleaved, and it is known that complete structural analysis cannot be accomplished only by the CID or IRMPD. In such a case, pretreatments using an enzyme or the like would be required, and this is the main impediment in realizing the high speed mass spectroscopy. In the case of biomolecules which have undergone post-translational modification, the polypeptide side chain added by the post-translational modification tends to become cleaved in the course of the CID or the IRMPD. Because of this cleavage of the side chain, type of the modified molecule and presence/absence of the modification can be estimated from the lost mass. However, the critical information on the site (i.e., the amino acid residue) of the modification would be lost.

On the other hand, in the case of ECD (electron capture dissociation) and ETD (electron transfer dissociation), cleavage site does depend on the amino acid sequence, and the backbone of the amino acid sequence is cleaved at one position, namely, at c-z site in FIG. 11 (with the exception of cyclic structures in which proline residue is not cleaved). Because of this, the protein molecules can be completely analyzed solely by means of mass spectroscopy technique. In addition, ECD and ETD are suitable for use in the study and analysis of post-translational modification since the side chain is less likely to be cleaved in the ECD and ETD. As a consequence, ECD and ETD have recently received particular attention as promising dissociation techniques.

However, ECD and ETD are capable of dissociating only positively charged multivalent ions. ECD is based on the principle of molecular dissociation by the capturing of the negatively charged electron by the positively charged molecule. Therefore, dissociation is not accomplished in the case of the negatively charged molecule, and also, the positively charged monovalent ions are not detected in the mass spectrometer system since such ion becomes a neutral molecule.

In the case of ECD, reaction efficiency is said to be proportional to the square of the electric charge, and therefore, protein can be efficiently dissociated since the protein has an extremely high valence. Because of this, an analysis called "top down analysis" has become a focus of attention. In this top down analysis, a protein is directly subjected to mass spectroscopy, as opposed to the "bottom up analysis" in which the protein is preliminarily digested by enzymes for its fragmentation before the mass spectroscopy. While the bottom up analysis has been unable to identify whether the analyte peptide is present in the form of a protein or in digested form in the living body, such identification has been enabled by the top down analysis since the biological sample is directly analyzed.

ECD is currently realized by Fourier-transform ion cyclotron resonance (FT-ICR) mass spectroscopy and radio frequency ion trap mass spectroscopy (Takeshi Baba et al. Electron Capture Dissociation in a Radio Frequency Ion Trap. Anal. Chem. 2004, Aug. 1; 76(15): 4263-6). FT-ICR has realized a resolution at the level of about 800,000 and an exact mass measurement at the level of ppb. FT-ICR, however, requires a strong parallel magnetic field of at least several tesla through the use of a superconducting magnet, and therefore, it is expensive and large-sized. FT-ICR also requires a measurement time of about several to 10 seconds for obtaining the data for one spectrum, and another about 10 seconds for the Fourier analysis necessary for obtaining the spectrum. This means that a total period of several dozen seconds is required for one spectrum in FT-ICR, and compatibility with liquid chromatography with the peak appearing in a time period of about 10 seconds is far from sufficient. On the other hand, when the radio frequency ion trap is combined with TOF, the data can be measured at the high resolution of about 15,000 and the exact mass measurement at the level of ppm, which may not be as high and exact as the FT-ICR. However, this combination is inexpensive and small-sized, and since this combination is capable of conducting the measurement at a high speed, it is highly compatible with the liquid chromatography (Hiroyuki Satake et al., Anal. Chem. 2007, 79, 8755-8761).

As described above, large scale protein analysis is being implemented by the progress of the mass spectrometer system and the liquid chromatography as well as the improvement of database technology. However, the number of proteins that can be analyzed in one cycle is yet several thousands at the very best, and this is why "focused proteome" not subjecting all but a particular set of the protein is currently the mainstream of the protein analysis.

For example, analysis focusing on phosphorylation which is a typical post-translational modification is widely practiced. However, analysis of the phosphorylation has two problems to be overcome. First, phosphorylation product may exhibit an ionization efficiency that is several hundred to several thousand times lower than that of the non-phosphorylation product. Second, when CID is used for the dissociation, proteins should be preliminarily decomposed into peptide fragments by enzymatic digestion before the CID since CID is incapable of dissociating the protein. For example, it has been estimated that, if a protein having a molecular weight of 40,000 is cleaved to produce 400 peptide fragments by enzymatic digestion, the phosphorylation product that had constituted about 30% of the entire protein would be reduced to the level of 0.08% or less by the enzymatic digestion (Experimental Medicine, Vol. 23 No. 19 2005, pp 2951-2956, in Japanese).

Because of these two limitations, phosphorylated peptides will rarely be identified if peptide fragments of the biological sample were subjected to mass spectroscopy with no further treatment. Accordingly, a technique utilizing the leaving of the post-translational modification site which is characteristic to the CID is used as a common technique to enable specific detection of the phosphorylated peptide. In the tandem mass spectroscopy using CID, a fragment ion comprising the phosphorylated peptide from which only the phosphate group has been lost and a fragment ion derived from the phosphate group are generated. This method for searching the phosphorylated peptide by focusing on the phosphate group is called "precursor ion scanning".

This precursor ion scanning is a technique in which all precursor ions generating a particular fragment ion are scanned. The ions that had passed through the scanning in the first mass separator MS-1 is subjected to CID in the collision cell, and of the resulting fragment ions, the ions having a particular m/z are detected in the second mass separator MS-2. When the particular fragment ions are detected in the MS-2, corresponding precursor ion that had passed through the MS-1 is identified. When the phosphate group is specifically detected, the ion having an m/z of 79 ($PO^{3-}$) is detected in negative mode (see "Experimental Protocols in Proteomics (in Japanese)" Shujun-sha, pp. 156-168).

SUMMARY OF THE INVENTION

In the qualitative analysis of proteins and peptides, not only the identification of the amino acid sequence, but also the identification of the type of the post-translational modification, structure of the modifying moiety, and site of modification is required. Also required is efficient realization of the maximum output without wasting the precious sample. It is also important to accomplish the series of analysis operations in a short period, namely, to accomplish high throughput of the analysis.

As described above, in the analysis targeting at the phosphorylation, which is a typical focused proteome analysis, phosphorylated peptide is specifically searched by the precursor ion scanning using the CID. Since phosphate group is negatively charged, this process should be conducted in negative mode. When the phosphorylated peptide is detected by this search, the phosphorylated peptide ion is isolated, and an attempt is made to conduct qualitative analysis by CID mass spectroscopy. However, the CID mass spectroscopy often results in the cleavage of the phosphate group, and hence, failure in identifying the site of phosphorylation. In such a case, second analysis will be conducted by using the precious sample, and in the second analysis, a qualitative analysis is conducted by ionization in positive mode followed by ion dissociation by ECD or ETD.

In the analysis of a peptide having a carbohydrate moiety which is a typical product of the post-translational modification, dissociation of monosaccharides such as fucose and sialic acid is readily observed when the analysis is conducted in positive mode. On the other hand, when the analysis is conducted in negative mode, dissociation of the carbohydrate moiety is not observed. Accordingly, the glycopeptide is first ionized in negative mode, and in the course of the dissociation of the glycopeptide by CID, the carbohydrate moiety is preferentially dissociated and the fragment ion from which only the carbohydrate moiety has been removed will be observed to thereby enable analysis of the carbohydrate structure. However, this CID results in the cleavage of the carbohydrate moiety from the polypeptide, and the information on the site (i.e., the particular amino acid) of the modification will be lost. Therefore, second analysis is conducted in positive mode, and while some of the carbohydrate moiety will be cleaved in the course of analysis, analysis by ECD or ETD will provide information on the amino acid sequence as well as site of the modification (Rapid Communications in Mass Spectrometry 2007; 21: 691-698).

In the top down analysis which has recently become a focus of attention, ECD and ETD should be conducted for the precursor ion having a valence or 10 or more, and the structural analysis can not be carried out if the molecular weight of the precursor ion and the molecular weight of the fragment ions generated by the dissociation in the ECD were not determined. The molecular weight (m) is calculated from the m/z value of the ion and the z value determined from the interval between the isotope peaks. In order to determine the interval between the isotope peaks which decreases with increase in the valence of the ion, a mass spectrometer having a high resolution will be required.

As described above, many biopolymers can be analyzed only by the combination of the CID which is a common ion dissociation technique widely used in the art with the ECD which is an ion dissociation technique complimentary to the CID. In addition, there are many biopolymers for which qualitatively analysis can not be conducted unless analysis at both positive and negative polarities can be conducted as in the case of the analysis of the carbohydrate moiety. When the mass spectrometer is connected to a liquid chromatograph, each peak of the ion is detected only for about 10 seconds, and accordingly, a high throughput mass spectrometer which can conduct the analysis at both polarities or dissociation by complimentary ion dissociation section such as ECD and CID in this limited duration is critical. There is also a demand for a high resolution mass spectrometer which is compatible with the top down analysis.

The polarity can be readily switched in the ion source, the quadrupole mass filter, the ion trap, and the like in about several dozen milliseconds, and a mass spectrometer allowing measurement in both polarities is commercially available. A mass spectrometer allowing use of ETD and CID in the same spectrometer is also commercially available.

Accordingly, it is a task of the present invention to provide a high throughput mass spectrometer with high resolution which can be combined with the analysis on a liquid chromatograph. As described above, FT-ICR mass spectrometer which has realized an extremely high resolution is insufficient in the throughput, and this type of mass spectrometer is not adequate for the analysis using a liquid chromatogram. However, a mass spectrometer called "Orbitrap" has recently become available. This Orbitrap uses magnetic field, and exhibits a high throughput (1 scan/second) and a high resolution (50000) as well as good compatibility with the liquid chromatogram. This Orbitrap, however, is extremely expensive. In order to produce an inexpensive mass spectrometer with high resolution, use of a TOF mass spectrometer is most adequate. However, control of the polarity switching in the TOF mass spectrometer requires an extremely high voltage, and such control is not as easy as that of the ion trap mass spectrometer, and the mass spectrometer would be highly expensive even if such polarity switching were enabled. A recent commercially available mass spectrometer which has enabled the polarity of the TOF mass spectrometer to be switched in a period of about 0.1 seconds is, indeed, quite expensive.

In the mass spectrometry system of the present invention using a tandem mass spectrometer, the mass spectrometry system includes an ion source for ionizing a sample; an ion deflector section for determining the direction of the ion by deflecting the ion trajectory; a first mass spectrometer section for conducting mass spectroscopy of the ion from the ion deflector section; a second mass spectrometer section having a polarity different from that of the first mass spectrometer section; and a control section for switching polarity of at least the ion source and the ion deflector section; in which the control section switches the polarity of at least the ion source and the ion deflector section based on the result obtained in the first mass spectrometer section, and the mass spectroscopy is conducted by the second mass spectrometer section.

In the mass spectroscopy method of the present invention, the mass spectroscopy can be carried out by switching polarity, and the mass spectroscopy method includes the steps of: separating a sample in a separation section provided in the upstream of an ion source in which the sample is ionized; ionizing the separated sample in the ion source at a desired polarity; dissociating the resulting sample ion by a dissociation section; subjecting the dissociated sample ion to first mass spectroscopy in a mass spectrometer section; if the target ion is detected in the first mass spectroscopy, dissociating the sample ion by a dissociation section which is different from the first dissociation section; and conducing second mass spectroscopy by the mass spectrometer section; in which ionization polarity of the sample in the second mass spectroscopy is determined depending on the result of the first mass spectroscopy.

The mass spectrometer system and the mass spectroscopy method of the present invention are capable of conducting a series of complimentary analyses at both positive and negative polarities in a short time without wasting the precious sample.

For the mass spectrometer section, a TOF mass spectrometer is employed to realize an inexpensive mass spectrometer having a high resolution. However, the TOF mass spectrometer is associated with the problem that a TOF mass spectrometer which allows change of polarity during the analysis would require a high voltage and large system which inevitably invite increase in the cost. Accordingly, another mass spectrometer section using an ion trap mass spectrometer is employed in the present invention. In the case of an ion trap mass spectrometer, polarity can be switched in about several dozen milliseconds, and the mass spectrometer is also inexpensive and has the MSn function by CID. However, when dissociation takes place in an ion trap mass spectrometer, small molecules will vibrate by resonance to become discharged from the ion trap. Because of this phenomenon, small molecules such as phosphate group (98 m/z) can not be detected by an ion trap mass spectrometer, and therefore, a collision cell is used in the present invention. A collision cell has the merit that small molecules are not discharged although it is incapable of conducting the ion isolation. The present invention also employs an ECD cell for conducting the ECD and a quadrupole mass filter for ion isolation whose polarity can be switched as in the case of the ion source, and optionally, other dissociation section such as ETD.

The constitution of the mass spectrometer as described above has enabled measurement in both polarities without switching the polarity of TOF mass spectrometer during the analysis as well as mass spectrometry at a high resolution and high throughput by an inexpensive mass spectrometer system.

In the mass spectrometer system of the present invention using the tandem mass spectrometer, a particular substance obtained by the separation of the sample is ionized to produce the precursor ion, and valence of this precursor ion is determined. If the valence could be determined, the ion is dissociated by ECD to carry out a further detailed analysis. If the valence could not be determined, the precursor ion is dissociated by CID and the valence of the fragment ions is determined, and the fragment whose valence could be determined is dissociated by ECD to carry out a further detailed analysis. Structural analysis of proteins having a high molecular weight which could not be analyzed by conventional method is thereby enabled.

Accordingly, the present invention provides an inexpensive mass spectrometer with high resolution, which has enabled measurement in both polarities as well as ion dissociation by two complimentary methods, namely, CID and ECD. In the identification of a substance by mass spectroscopy according to the present invention, information on the structure of the substance can be obtained at an improved efficiency, the time required for the measurement as well as the identification of the substance can be reduced, and the precision of the identification can also be improved.

DETAILED DESCRIPTION OF THE PREFERRED EMBODIMENT

Figure 1:
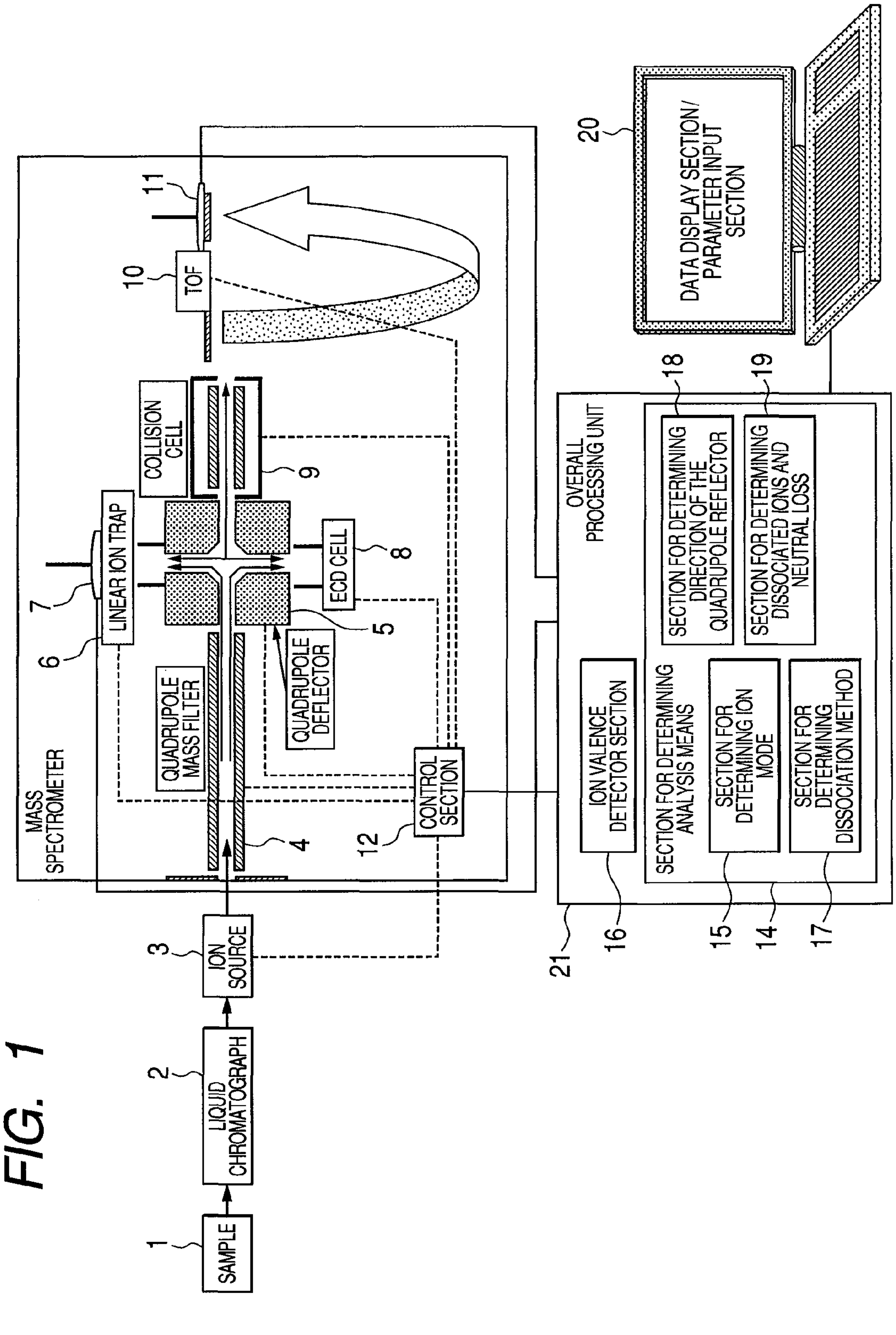
FIG. 1 is a view showing an embodiment of the mass spectrometer system according to the present invention.

FIG. 1 shows an embodiment of the mass spectrometer system according to the present invention. An analyte sample 1 is separated by a gas chromatograph (GC) or in the pretreatment of a liquid chromatograph (LC) 2. The separated sample is ionized in an ion source 3, and then, introduced in the mass spectrometer. The ions introduced are isolated in a quadrupole mass filter 4, and the particular isolated ions (or all ions) are discharged from a quadrupole deflector 5 to a linear ion trap (LIT) 6, an ECD cell 8, or a collision cell 9. The quadrupole deflector 5 is capable of moving the ion in all directions. For example, the ions introduced to the ECD cell 8 are dissociated by the ECD and directed to the LIT 6 or the collision cell 9. In the LIT 6 and the collision cell 9, the ions can be dissociated by CID. The ions discharged from the LIT 6 and the collision cell 9 are separated in a LIT detector 7 or a TOF detector 11 depending on their mass-to-charge ratio m/z. TOF having a high resolution is provided in the upstream of the TOF detector 11, and the LIT has the function of MSn.

The separated ions are detected in the ion detector section 7 or 11, and the valence determined in an ion valence determining section 16 is organized and processed as a data in an overall processing unit 21 together with m/z value of each ion, and the thus obtained mass spectroscopy data is displayed on a data display section 20. The series of mass spectroscopy steps, namely, the separation and ionization of the sample as well as the transportation, the separation, the dissociation, the mass separation, the ion detection and the data processing in the mass spectrometer are all controlled by the overall information processing unit 21. In a parameter input section 20, input of information necessary for the user, namely, at an information on section for determining ion mode 15, a section for determining dissociation method 17, a section for determining direction of the quadrupole reflector 18, and a section for determining dissociated ions and neutral loss 19.

The ion source 3, the quadrupole mass filter 4, the quadrupole deflector 5, the LIT 6, the collision cell 9, and the TOF 10 are controlled by control section 12, and positive/negative switching is possible in these sections. However, an expensive spectrometer will be required if the switching of the polarity is to be carried out in the TOF section 10 in a short time. Therefore, the mass spectrometer is preferably enabled to switch the polarity of the TOF section 10 before analyzing the sample.

Next, an embodiment of the present invention is described:

Embodiment 1

Figure 2:
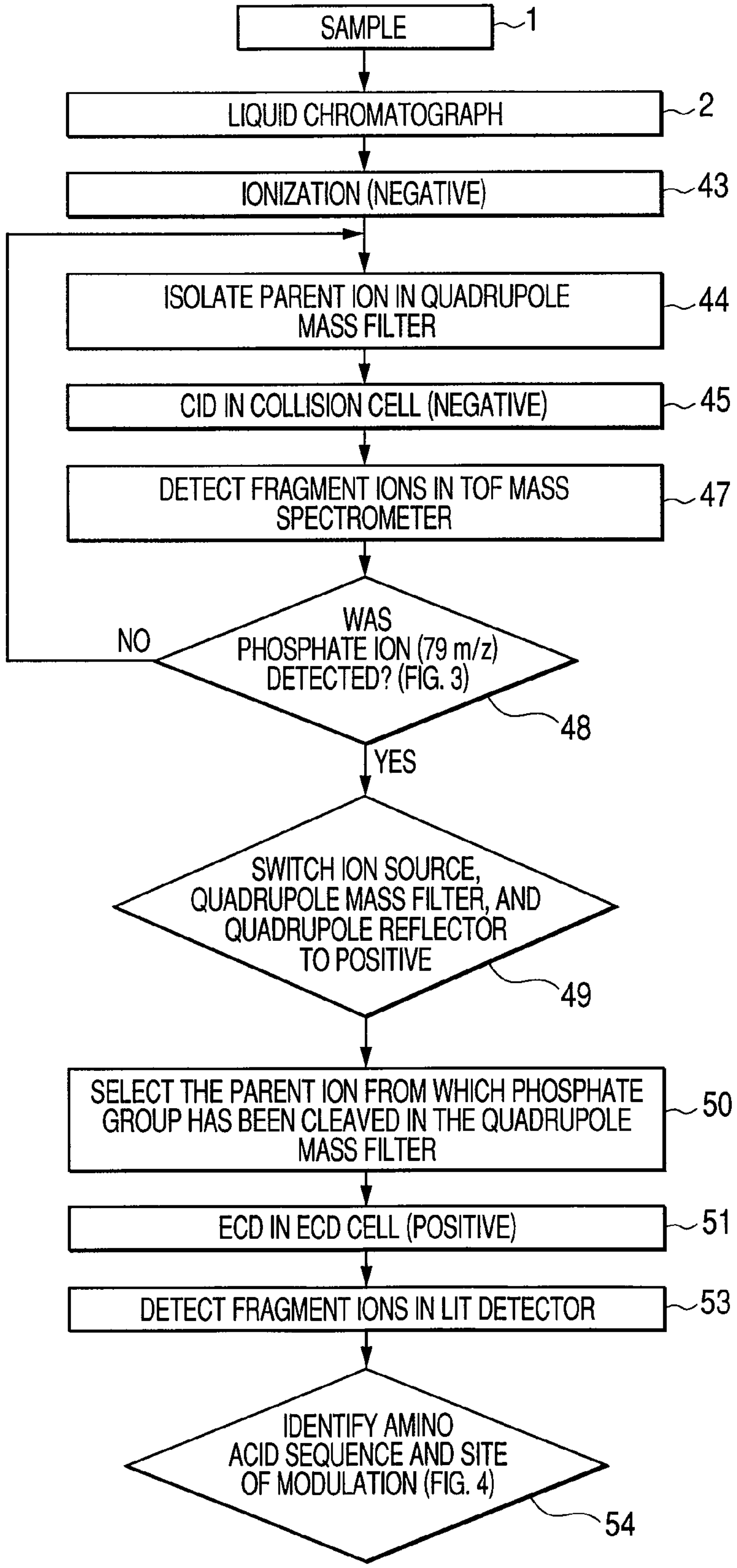
FIG. 2 shows a schematic flow in which a phosphorylation product is searched by CID and the substance identification is conducted by ECD.

This is an embodiment of proteome analysis focusing on phosphorylation, which is the typical post-translational modification. FIG. 2 shows a flowchart in which the phosphorylation product is searched from a large number of non-phosphorylation products, and the phosphorylation product is subjected to a qualitative analysis.

Before the start of the analysis, polarity of the ion source 3, the quadrupole mass filter 4, the quadrupole deflector 5, the collision cell 9, and the TOF 10 is negative, and the polarity of the LIT 6 is positive. The polarity of the ECD cell 8 is theoretically always positive.

The sample that had been separated at the liquid chromatograph 2 is ionized in negative mode (43), and the resulting ions pass through the quadrupole mass filter, the quadrupole deflector, and the collision cell to be detected at the TOF (MS1). Next, a particular precursor ion is isolated by the quadrupole mass filter from the ions detected at the MS1 (44). The isolated precursor ion passes through the quadrupole deflector, and the ion is then subjected to CID in the collision cell (45). The fragment ions generated by the CID are detected by the TOF section (47). While the LIT 6 is capable of carrying out the CID, the small fragment ions at a level of about 100 m/z vibrating by resonance under the influence of the radio frequency voltage can not be retained in the LIT, and hence, such fragment ions are undetectable. Therefore, the CID should be carried out at the collision cell 9.

Figure 3:
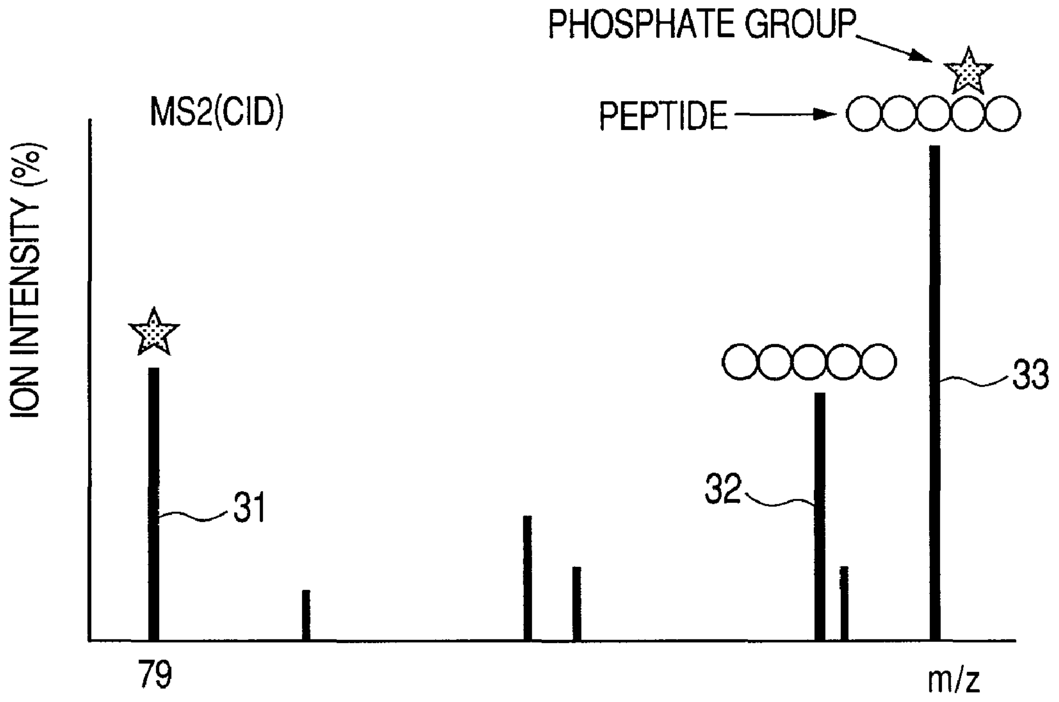
FIG. 3 is an exemplary mass spectrum obtained by dissociation of the phosphorylated peptide by CID.

When phosphorylation product is present in the ions isolated by the quadrupole mass filter 4, dissociated phosphate group (79 m/z) dissociated by the CID will be detected. This result of MS2 obtained by the CID includes important information for qualitative analysis while this information is expected to be insufficient information. FIG. 3 shows typical spectrum obtained when phosphorylated peptide 33 is analyzed by using the CID. In the CID, priority is given to the dissociation of the phosphate group, and therefore, neutral loss 32 which is the peptide from which only phosphate ion 31 and phosphate group had been lost is detected in this process. Use of the CID, however, suffers from the difficulty of identifying the amino acid sequence and the site of modification.

In view of the situation as described above, when the phosphate group ion is detected (48), the mode is switched from the negative mode to the positive mode (49) in order to carry out a more detailed qualitative analysis by using the ECD. This switching is conducted at the ion source, the quadrupole mass filter, and the quadrupole deflector.

Next, the ion located at the position of the mass-to-charge ratio detected in the negative mode plus 2 is isolated from the ions that had been introduced in the quadrupole mass filter (50).

When the ionization is conducted in the positive mode, the phosphate ion that had been detected in the negative mode is typically detected at the position of the mass-to-charge ratio plus 2. This is because, in the negative mode, the ionization takes place by loosing $H^+$ (proton) while the ionization in the positive mode takes place by addition of the proton. In other words, when a substance having a molecular weight M is ionized to a valence of x, the ion detected in the negative mode has a mass-to-charge ratio of (M−xH)/x, while the ion detected in the positive mode has a mass-to-charge ratio of (M+xH)/x, and the difference will be 2H. Since molecular weight of hydrogen is 1, this difference is 2.

Figure 4:
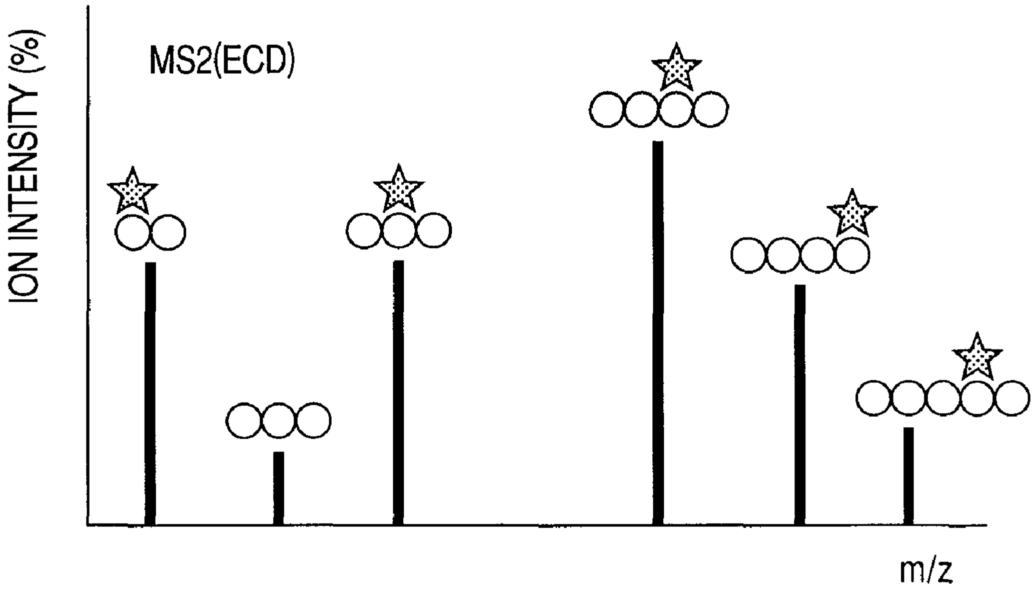
FIG. 4 is an exemplary mass spectrum obtained by dissociation of the phosphorylated peptide by ECD.

The ion isolated in the quadrupole mass filter 4 is introduced to the ECD cell 8 through the quadrupole deflector 5, and the ECD is conducted in the ECD cell 8 (51). The fragment ion again passes through the quadrupole deflector 5 to be detected in the LIT detector 7 (53). FIG. 4 shows schematic spectrum obtained by the ECD analysis. In the ECD, only the peptide bond is dissociated with no dissociation of the phosphate group, and this allows the identification of the amino acid sequence and the site of modification.

The fragment information obtained by using the ECD is precisely analyzed by combining with the fragment information obtained by using the CID to thereby identify the amino acid sequence and the site of modification (54).

As described above, in contrast to the prior art systems in which the search of the phosphorylated polypeptides, the structural analysis by using the CID, the structural analysis by the ECD, and the like had been independently conducted, the system and the method of the present invention have enabled to obtain the results of the analysis in short time.

Embodiment 2

Figure 5:
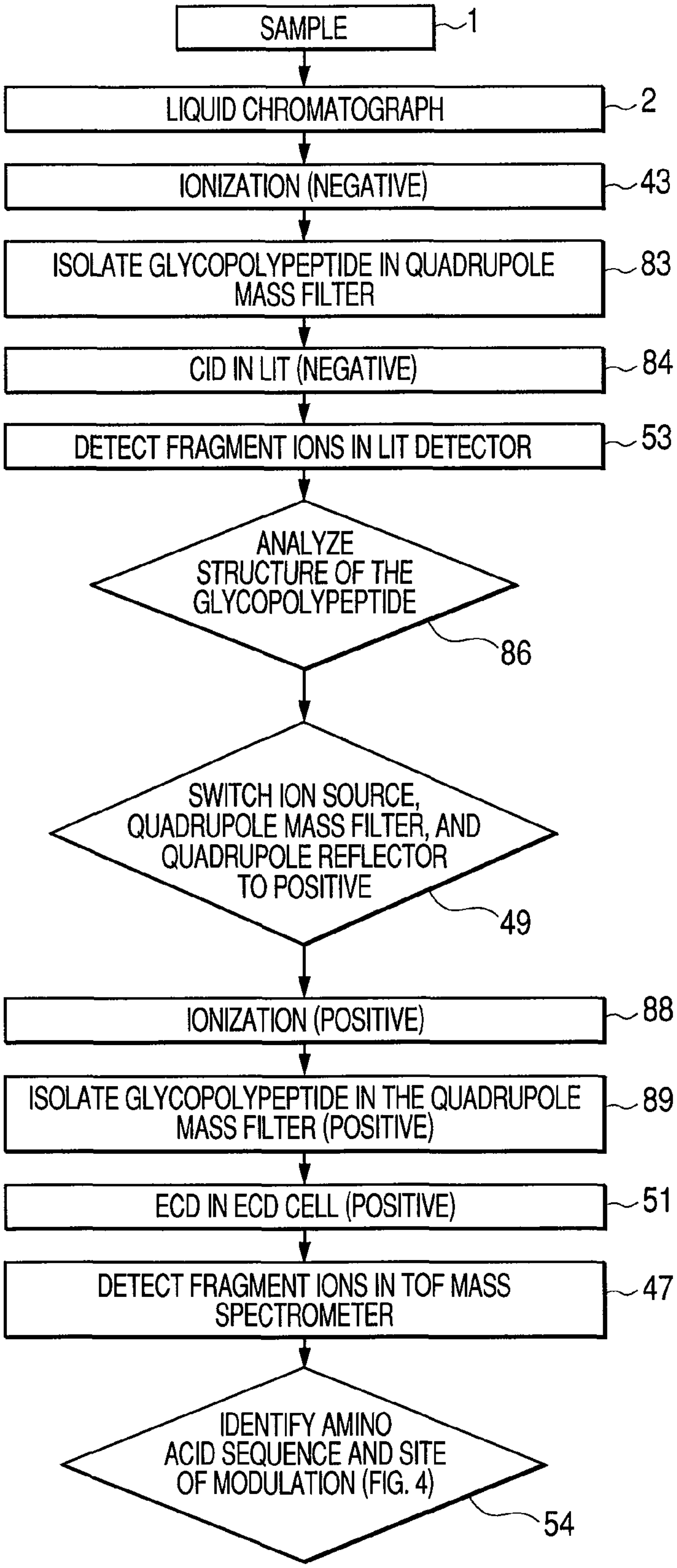
FIG. 5 shows a schematic flow diagram of a substance identification of a glycopolypeptide.

FIG. 5 shows a flow chart of an embodiment of the proteome analysis focusing on glycopolypeptide, in which the carbohydrate structure is analyzed in negative mode, and the amino acid sequence and the site of glycosylation are identified in positive mode.

Before the start of the analysis, polarity of the ion source 3, the quadrupole mass filter 4, the quadrupole deflector 5, and the LIT 6 is negative, and the polarity of the collision cell 9 and the TOF 10 is positive. The polarity of the ECD cell 8 is theoretically always positive.

The sample separated at the liquid chromatograph 2 is ionized in negative mode, and the ions pass through the quadrupole mass filter 4, the quadrupole deflector 5, and the LIT 6. are detected at the TOF (MS1). Next, a particular precursor ion of glycopolypeptide is isolated by the quadrupole mass filter 4 from the ions detected at the MS1 (83). The isolated precursor ion passes through the quadrupole deflector 5, and then, subjected to CID in the LIT (84). The fragment ions generated by the CID are detected by the LIT detector 7 (MS2/CID) (53).

Next, the polarity is switched from the negative mode to the positive mode (49). The polarity is switched at the ion source 3, the quadrupole mass filter 4, and the quadrupole deflector 5.

Ionization of the glycopolypeptide or isolation of the ion in positive mode may generally induce partial cleavage of the carbohydrate moiety. However, such cleavage of the carbohydrate moiety is suppressed by the use of quadrupole mass filter 5 instead of the ion trap.

The glycopolypeptide ions that have been ionized in the positive mode (88) and analyzed in the negative mode are then isolated at the quadrupole mass filter 4 (89). When the ion of the same valence is isolated, the ion is detected at the position of the mass-to-charge ratio plus 2.

The ions isolated by the quadrupole mass filter 4 are then introduced to the ECD cell 8 through the quadrupole deflector 5, and the ECD is conducted in the ECD cell 8 (51). The fragment ion again passes through the quadrupole deflector 5 and the collision cell 9 to be detected in the TOF detector 11 (MS2/ECD) (47).

Information on the carbohydrate structure is obtained from the fragment ions resulting from the CID in the negative mode (86). Information on the amino acid sequence and the site of modification is obtained from the fragments resulting from the ECD in the positive mode (54). Detailed analysis is carried out by combining both sets of information.

Figure 6:
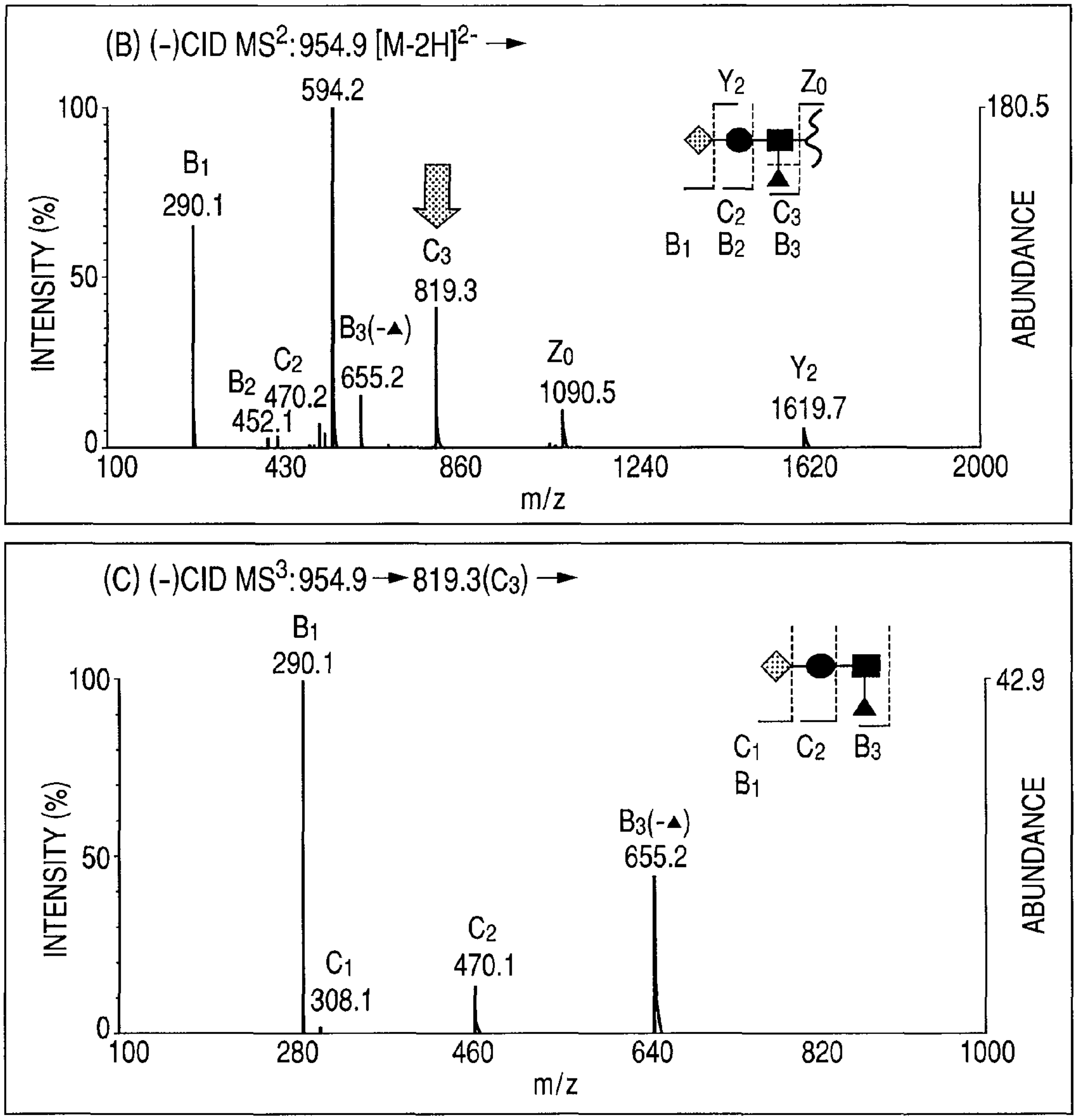
FIG. 6 shows an embodiment of analyzing a carbohydrate structure of a glycopeptide in negative mode. The upper graph (B) is the result obtained in MS2 (CID), and the lower graph (C) is the result obtained in MS3 (CID)
Figure 7:
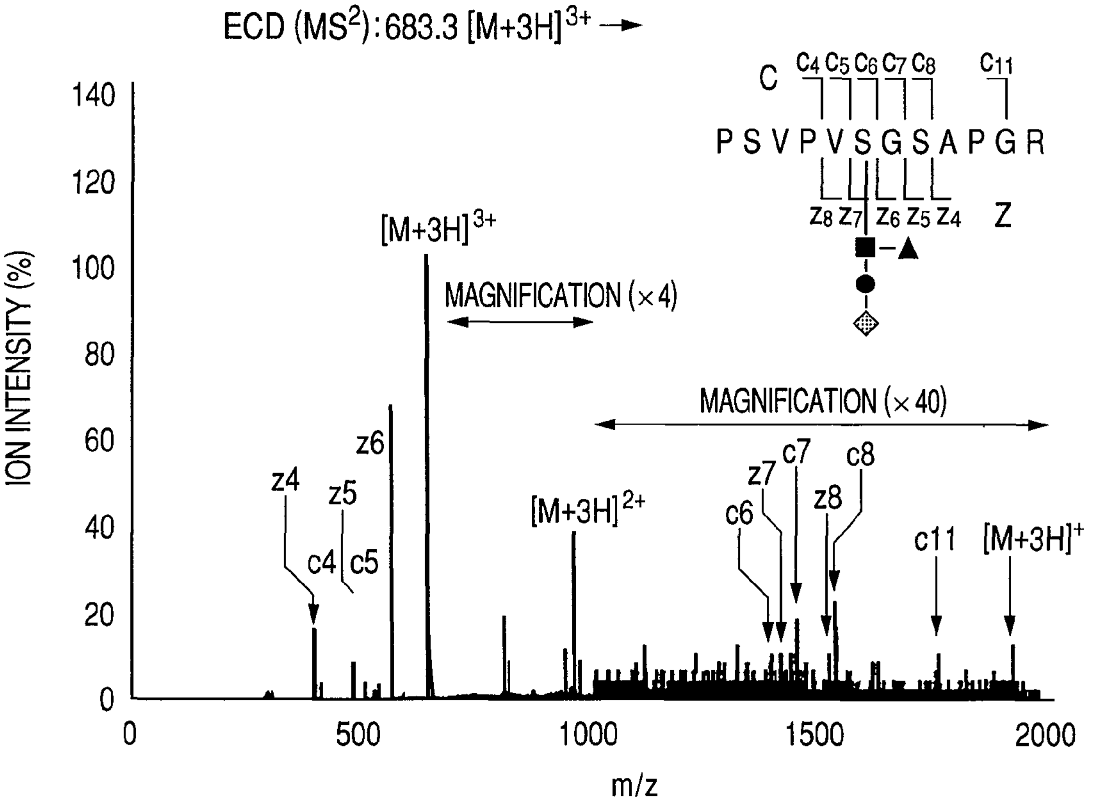
FIG. 7 shows an embodiment of identifying the amino acid sequence and the site of glycosylation by conducing MS2 (ECD) in positive mode.

The embodiment is shown in FIGS. 6 and 7. FIG. 6 is the data obtained in the analysis by CID for the negative ion (deprotonated molecule) derived from the glycosylated peptide. The precursor ion in this data is $[M-2H]^{2-}$ having a m/z value of 954.9 where M represents a glycosylated peptide molecule and H represents hydrogen ion, and this $[M-2H]^{2-}$ ion is a divalent ion from which two protons have been lost. FIG. 6B shows the data obtained in the MS2/CID analysis by CID for this precursor ion. The carbohydrate moiety is schematically shown in the upper right of FIG. 6B, where B and C represent ions dissociated at the site of glycosidic linkage, wavy line represents the peptide, diamond represents Neu5Ac (N-acetylneuraminic acid having a molecular weight of 309.1), solid circle represents (galactose having a molecular weight of 180.05), solid square represents GlcNAc (N-acetylglucosamine having a molecular weight of 221.08), triangle represents Fuc (fucose having a molecular weight of 164.06), and the broken line represents site of dissociation.

Since glycosidic linkage between monosaccharide molecules is formed by dehydration reaction, the carbohydrate moiety has a molecular weight which is the sum of the molecular weight of the monosaccharide molecules from which molecular weight of one water molecule (i.e. 18) is subtracted per one glycosidic linkage. The mass-to-charge ratio of 819.3 detected in FIG. 6B (monovalent, molecular weight 820.3) is the value corresponding to the sum of the molecular weight of the 4 monosaccharides (309.1+180.05+221.08+164.06=874.29) from which the value corresponding to 3 glycosidic linkages (18×3=54) has been subtracted (i.e. the molecular weight is 874.29−54=820.29). As demonstrated in FIG. 6B, this value corresponds to C3. This ion C3 was isolated for the precursor ion, and the data obtained in MS3/CID analysis by the CID is shown in FIG. 6C which demonstrates the carbohydrate structure.

Next, the same glycopeptide was ionized in positive mode. The data obtained in the MS2/ECD analysis by the ECD is shown in FIG. 7. In the ECD, cleavage occurs at a particular site in the peptide linkage to allow the detection c and z ions. Structure of the glycosylated peptide and the detected ions are shown in the upper right of FIG. 7. The horizontal sequence of alphabets corresponds to the amino acid sequence. When data base search was conducted on the base of the data obtained in the MS2/ECD analysis, a large number of c and z ions were detected that leads to the information on the amino acid sequence as shown in FIG. 7, and the original protein was identified. The database search also revealed that the 7th serine (S) from the C terminal is modulated with the carbohydrate moiety. The precursor ion in this data is a $[M+3H]^{3+}$ having a m/z of 638.3. The data obtained in the MS2/ECD by ECD also includes ions ($[M+3H]^{2+}$, $[M+3H]^{+}$) in which only charge number has been reduced by recombination of the precursor ions by electronic capture are also detected.

As described above, the present invention has enabled to detect the carbohydrate structure, the amino acid sequence, and the site of glycosylation by one analysis while two independent analyses had been required in the prior art for detection of these items. Amount of the sample used in the detection can also be reduced.

Embodiment 3

Figure 8:
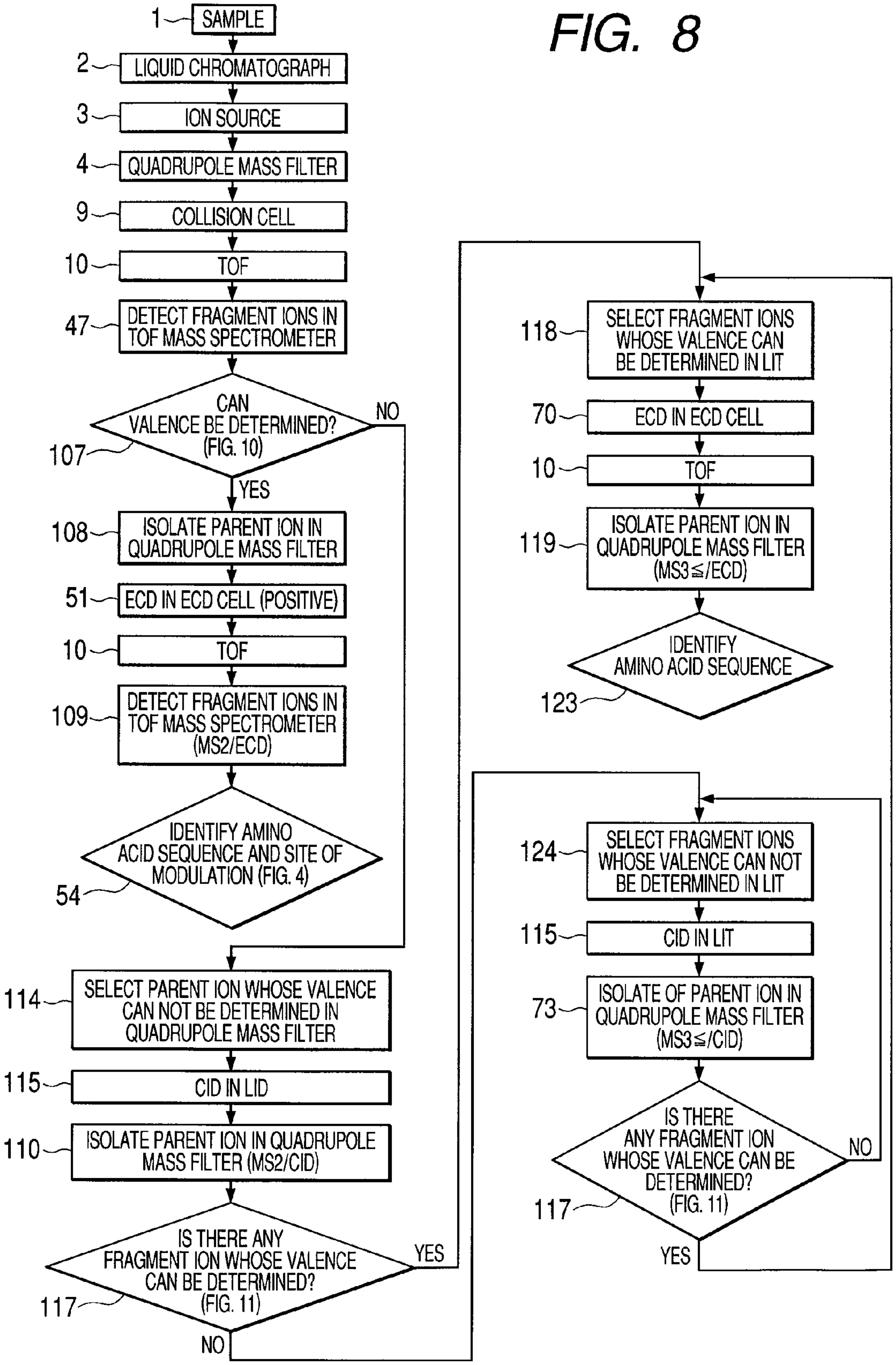
FIG. 8 shows a schematic flow diagram of a substance identification in which the sample includes a protein.

FIG. 8 shows a flowchart of an embodiment of the proteome analysis in which protein is used for the sample.

In this embodiment, polarity is positive in all sections of the mass spectrometer. However, simultaneous use of positive and negative polarities, use of solely the negative polarity, as well as switching of the polarity during the analysis are also acceptable.

The sample 1 separated at the liquid chromatograph 2 is ionized in positive mode, and the ions pass through the quadrupole mass filter 4, the quadrupole deflector 5, and the collision cell 9 to be detected at the TOF detector 11 (MS1) (47). The ion having an ion intensity exceeding a certain intensity is carried out at this stage (107). Since the molecule constituting the ion contains a certain amount of the isotope elements, a series of ions containing the isotope are simultaneously observed. The interval at the m/z axis will be l/z, and the valence of the ion can be determined by using this phenomenon. The extent of the valence determination is dependent on the performance, and in particular, on the mass resolution of the mass spectrometer. In this context, the ions whose valence can be determined are ions having a valence which is not more than the valence that can be determined by the mass spectrometer. For example, the ion having a valence of up to 6 is searched in the case of the mass spectrometer which can reliably determine the valence of up to 6.

Figure 9:
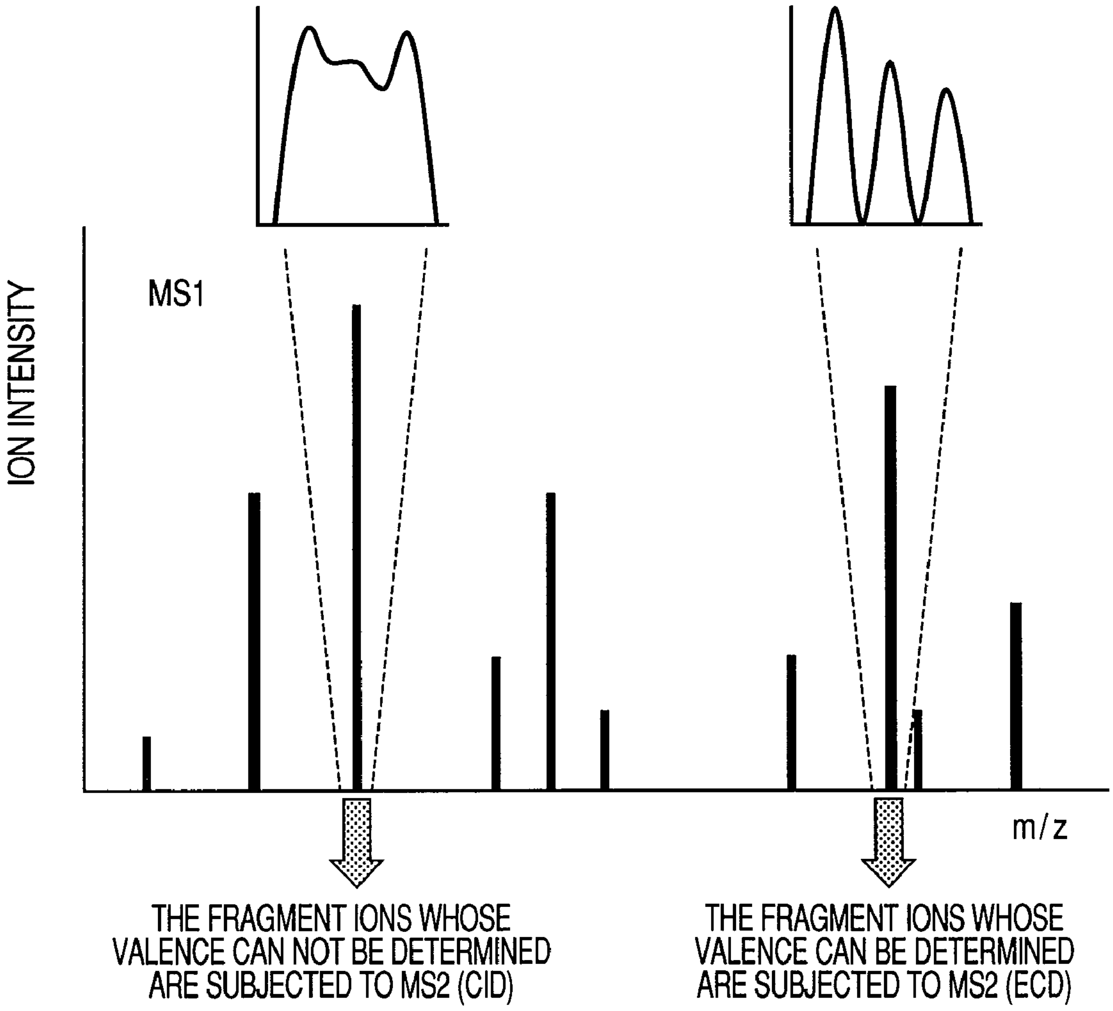
FIG. 9 shows an embodiment in which the ion is detected by MS1.

FIG. 9 is a schematic view of MS1. The ions whose valence can be determined are isolated in the quadrupole mass filter (108), and the isolated precursor ions pass through the quadrupole deflector 5. ECD is conducted in the ECD cell 8 (51). The fragment ions generated in the ECD are again discharged to the quadrupole deflector 5, and the ions are detected at the TOF detector 11 (MS2/ECD) (109).

When the proteins whose valence can not be determined are isolated in the MS1, the precursor ions are isolated in the quadrupole mass filter 5 (114), and after passing the quadrupole reflector 5, the ions are subjected to CID at the LIT 6 (115). The fragment ions are introduced in the TOF detector 11, at which the ions are detected (110).

Figure 10:
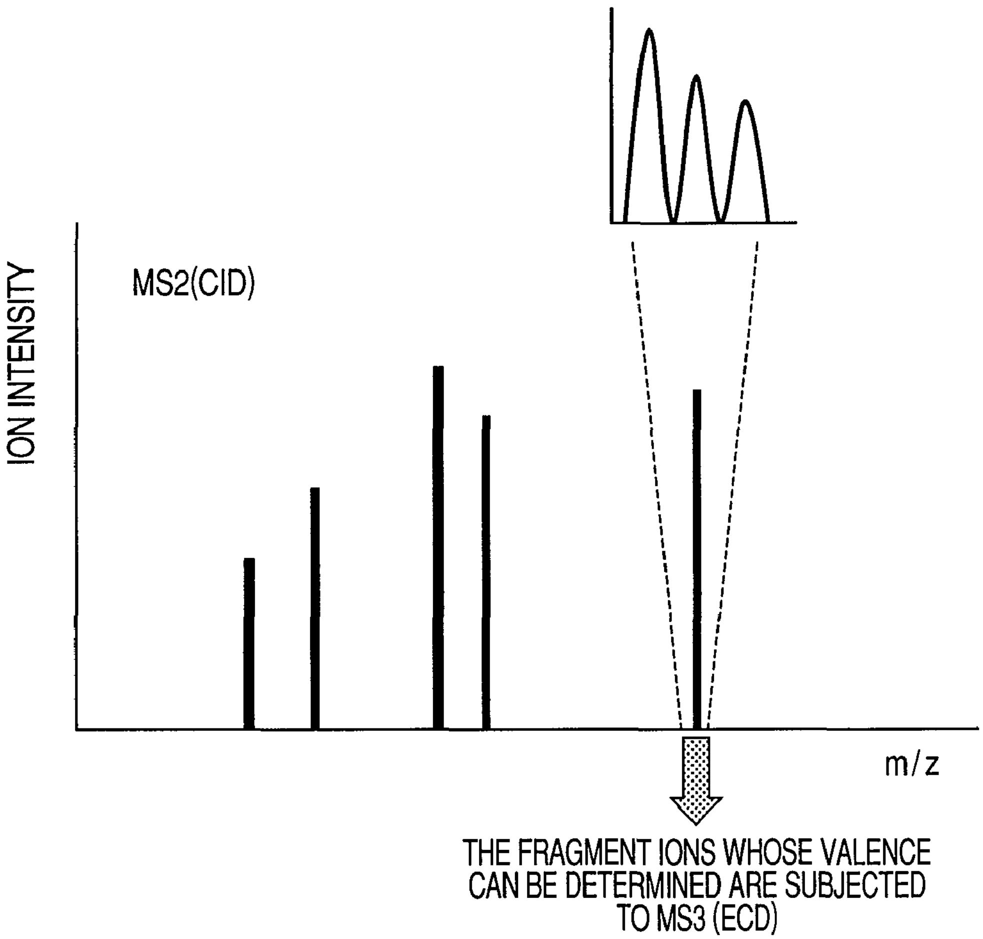
FIG. 10 shows an embodiment in which the ion is detected after MS2/CID.
Figure 11:
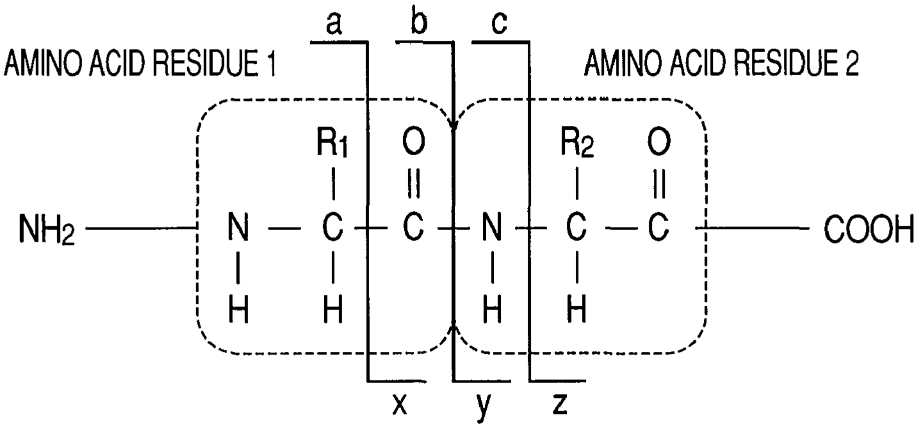
FIG. 11 shows dissociation pattern of a polypeptide.

The ions exhibiting an ion intensity exceeding a certain level are then determined for their valence (117). When an ion whose valence can be determined is present in the fragment ions (FIG. 10), the precursor ion is isolated by the quadrupole mass filter 4, and CID is carried out at the LIT 6 for isolation of the fragment ion that had been detected in the previous step (118). The isolated ion passes through the quadrupole deflector 5, and ECD is again conducted in the ECD cell 8 (70), and again discharged to the quadrupole deflector 5, and the ion is detected at the TOF detector 11 (MS3/ECD) (119).

When the ion whose valence can be determined by MS2/CID is absent, MS3/CID is additionally carried out, and MSn is repeated until the ion whose valence can be determined is detected. Alternatively, MS3/CID may be carried out for other ions detected in the MS2/CID.

The precursor ion whose valence could be determined may also allow for identification of its type and site of modification. On the other hand, in the case of the precursor ion whose valence could not be determined, ECD is conducted only for a part of the partial dissociation product of the CID. Although the protein is not entirely analyzed, protein identification is possible.

In the mass spectroscopy constitution, a certain precursor ion may be subjected to both the CID and the ECD to thereby obtain an increased amount of the qualitative information. For example, when the dissociation by CID is decided to be insufficient, ECD may be carried out for the same precursor ion, or alternatively, when information is decided to be still insufficient after carrying out ECD for a certain precursor ion, CID may be carried out for the same precursor ion.

As described above, precision of the analysis can be improved by conducting another dissociation method when sufficient fragments are not obtained by one dissociation method.

It is also possible to obtain data for both polarity for one peptide.

The present invention has also partially enabled to conduct structural analysis for a protein having a high molecular weight which could not be analyzed by the prior art.

What is claimed is:

1. A mass spectrometry system comprising:

an ion source for ionizing a sample;

an ion deflector section for determining the direction of the ion by deflecting the ion trajectory;

a first mass spectrometer section for conducting mass spectroscopy of the ion from the ion deflector section;

a second mass spectrometer section having a polarity different from that of the first mass spectrometer section; and a control section for switching a polarity of at least the ion source and the ion deflector section, wherein the control section switches the polarity of at least the ion source and the ion deflector section based on the result obtained in the first mass spectrometer section, and the mass spectroscopy is conducted by the second mass spectrometer section.

2. A mass spectrometry system according to claim 1, wherein the first mass spectrometer section or the second mass spectrometer section is a time-of-flight mass spectrometer.

3. A mass spectrometry system according to claim 1, wherein the first mass spectrometer section or the second mass spectrometer section is an ion trap mass spectrometer.

4. A mass spectrometry system according to claim 1, having a collision induced dissociation section, and an electron capture dissociation section or an electron transfer dissociation section.

5. A mass spectrometry system according to claim 4, wherein a polarity switching in the collision induced dissociation section is conducted by the control section.

6. A mass spectrometry system according to claim 5, wherein the polarity switching in the ion source, the ion deflector section, the first or the second mass spectrometer section, and the collision induced dissociation section can be conducted during the measurement.

7. A mass spectrometry system according to claim 4, wherein the collision induced dissociation section comprises an ion trap and a collision cell.

8. A mass spectrometry system according to claim 1, further comprising:

an isolation section that isolates an ion having a particular mass-to-charge ratio, said isolation section provided between the ion source and the ion deflector section.

9. A mass spectrometry system according to claim 8, wherein a polarity switching in the isolation section is conducted by the control section.

10. A mass spectrometry system according to claim 9, wherein the polarity switching in the ion source, the ion deflector section, the first or the second mass spectrometer section, and the isolation section can be conducted during the measurement.

11. A mass spectrometry system according to claim 8, wherein the isolation section is a quadrupole mass filter.

12. A mass spectrometry system according to claim 1, further comprising:

a separation section for separating the sample before the ion source in which the sample is ionized.

13. A method for conducting mass spectroscopy in a mass spectrometry system capable of carrying out the mass spectroscopy by switching polarity, comprising the steps of:

separating a sample in a separation section provided upstream of an ion source wherein the sample is ionized;

ionizing the separated sample in the ion source at a desired polarity;

dissociating the resulting sample ion by a dissociation section;

subjecting the dissociated sample ion to a first mass spectroscopy in a mass spectrometer section;

if the target ion is detected in the first mass spectroscopy, dissociating the sample ion by a dissociation section which is different from the dissociation section as described above; and conducting a second mass spectroscopy by the mass spectrometer section, wherein an ionization polarity of the sample in the second mass spectroscopy is determined depending on the result of the first mass spectroscopy.

14. A method for conducting mass spectroscopy according to claim 13, wherein the mass spectroscopy is conducted by one or both of a time-of-flight mass spectrometer and an ion trap mass spectrometer.

15. A method for conducting mass spectroscopy according to claim 13, further comprising the steps of:

ionizing the sample to the desired polarity by the ion source;

dissociating the resulting sample ion by a collision induced dissociation section to produce fragment ions;

conducting mass spectroscopy of the fragment ions produced by the collision induced dissociation;

setting the ionization polarity to "positive" when the desired fragment is detected by the mass spectroscopy;

capturing the ionized sample ion at the positive polarity by an electron capture dissociation section to produce fragment ions; and conducting mass spectroscopy of the fragment ions produced by the electron capture dissociation.

16. A method for conducting mass spectroscopy according to claim 15, wherein the collision induced dissociation section comprises an ion trap and a collision cell.

17. A method for conducting mass spectroscopy according to claim 15, wherein the ion is guided to the mass spectrometer section, the collision induced dissociation section, or the electron capture dissociation section by an ion deflector section for determining the direction of the ion by deflecting the ion trajectory.

18. A method for conducting mass spectroscopy according to claim 17 having a particular mass-to-charge ratio is provided between the ion source and the ion deflector section.

19. A method for conducting mass spectroscopy, comprising the steps of:

ionizing a sample by an ion source, the sample having been separated in a separation section provided in the upstream of the ion source wherein the sample is ionized;

subjecting the thus produced sample ion to mass spectroscopy in a mass spectrometer section; and determining a valence of the target sample ion from the result of the mass spectroscopy in the mass spectrometer section, wherein the ions whose valence could be determined are isolated by a section that isolates ions having a particular range of mass-to-charge ratio, captured by an electron capture dissociation section, and subjected to mass spectroscopy by the mass spectrometer section; while the ions whose valence could not be determined are repetitively dissociated by the collision induced dissociation section until the valence becomes the one which can be determined.

20. A method for conducting mass spectroscopy according to claim 19, wherein a polarity switching in the ion source, the mass spectrometer, the isolation section, and the collision induced dissociation section is conducted by the control section.

* * * * *